United States Patent [19]

Pauwels

[11] 4,182,536
[45] Jan. 8, 1980

[54] ADAPTIVE BRAKING MODULATOR VALVE

[75] Inventor: Edward M. Pauwels, South Bend, Ind.

[73] Assignee: The Bendix Corporation, Southfield, Mich.

[21] Appl. No.: 892,576

[22] Filed: Apr. 3, 1978

[51] Int. Cl.² ............................................. B60T 13/68
[52] U.S. Cl. .................................... 303/115; 303/116
[58] Field of Search .......................... 303/10, 115, 116

[56] References Cited

U.S. PATENT DOCUMENTS

| 3,610,702 | 10/1971 | MacDuff | 303/115 |
| 3,861,757 | 1/1975 | Jackson et al. | 303/115 X |
| 4,012,081 | 3/1977 | Doversberger | 303/115 |
| 4,116,495 | 9/1978 | Belart | 303/115 |
| 4,121,872 | 10/1978 | Burgdorf et al. | 303/115 X |

Primary Examiner—Stephen G. Kunin
Attorney, Agent, or Firm—Paul David Schoenle; Ken C. Decker

[57] ABSTRACT

In a single fluid brake system a modulator valve communicates with a pressure source and provides for communication of pressurized fluid from a master cylinder or brake booster to a wheel assembly to effectuate braking of the latter. An electronic control unit monitors the wheel speed of the wheel assembly and cooperates with the modulator valve to relieve braking pressure when a skidding condition is imminent. The modulator valve includes a first piston which forms a variable volume chamber in communication with the wheel assembly and a second piston which cooperates with the electronic control unit to provide for movement of the first piston during skidding. When the first piston moves, the variable volume chamber is expanded to receive fluid from the wheel assembly thereby relieving braking pressure to avoid skidding of the wheel asembly. Normally, the second piston includes opposite faces which are exposed to a reservoir; however, when the electronic control unit is activated upon imminent skidding, the second piston is exposed to pressurized fluid from the pressure source on one face to move the second piston and impart movement to the first piston. A sleeve between the pistons forms a portion of a passage through the modulator valve and limits the movement of the first piston in one direction.

1 Claim, 3 Drawing Figures

ADAPTIVE BRAKING MODULATOR VALVE

BACKGROUND OF THE INVENTION

In a single fluid brake system which includes a modulator valve and an electronic control unit to compensate for skidding of a wheel assembly the brake pressure at the wheel assembly is usually communicated to a reservoir to relieve braking pressure, such as illustrated in U.S. Pat. No. 4,129,341. After the skidding condition subsides, a reapplication of the brakes communicates pressurized fluid from the pressure source or a master cylinder to the wheel assembly to reapply the brakes.

It is believed to be desirable to return the same volume of fluid to a wheel assembly after termination of skidding as that volume which was expelled upon imminent skidding. Moreover, a simple modification to the modulator valve is believed to enhance manufacturing and cost efficiencies.

SUMMARY OF THE INVENTION

The present invention relates to a particular construction for a modulator valve in a single fluid brake system. The modulator valve cooperates with a control unit to relieve brake pressure in a wheel system upon imminent skidding. A fluid pressure generator, such as a master cylinder or brake booster communicates pressurized fluid to the modulator valve and a passage therein directs the pressurized fluid to the wheel assembly during a braking application.

The modulator valve forms a pair of chamber with a first piston slidably mounted in one chamber and a second piston slidably mounted in the other chamber. The first piston cooperates with a housing for the modulator valve to form a portion of the passage communicating with the wheel assembly. The second piston includes opposite faces which are normally in communication with a reservoir. A sleeve is engageable with the first piston to limit movement of the first piston in one direction and is resiliently urged away from the second piston to remain in engagement with the first piston.

When a skidding condition is imminent for the wheel assembly, the control unit is activated to expose one face of the second piston to a pressure source, thereby causing the second piston to move toward the sleeve and close communication between the fluid pressure generator and the wheel assembly. Further movement of the second piston moves the sleeve into engagement with the first piston causing the first piston to move. When the first piston moves in the one chamber the volume therein is expanded so that the portion of the passage communicating with the wheel assembly communicates the expanding chamber with the wheel assembly to relieve the brake pressure in the wheel assembly. Consequently, the imminent skidding condition is terminated and the control unit deactivated. As a result the control unit exposes both faces of the second piston to the reservoir and the second piston is biased to return to its non-skidding position. As the second piston moves to its non-skidding position, the first piston moves with the second piston to contract the one chamber, thereby forcing pressurized fluid stored therein to communicate with the wheel assembly to reapply the brakes of the wheel assembly. If the communication of stored fluid pressure from the contracting chamber to the wheel assembly creates an imminent skidding condition, the control unit is activated to change the movement of the second piston and the first piston to relieve braking pressure in the manner described above. If the stored fluid pressure is communicated to the wheel assembly without causing an imminent skidding condition, the movement of the second piston will abut the sleeve against the housing to limit the movement of the first piston. Thereafter movement of the second piston relative to the sleeve and first piston opens the passage in the modulator valve to communicate the fluid pressure generator with the wheel assembly to continue braking.

DETAILED DESCRIPTION

Figure 1:
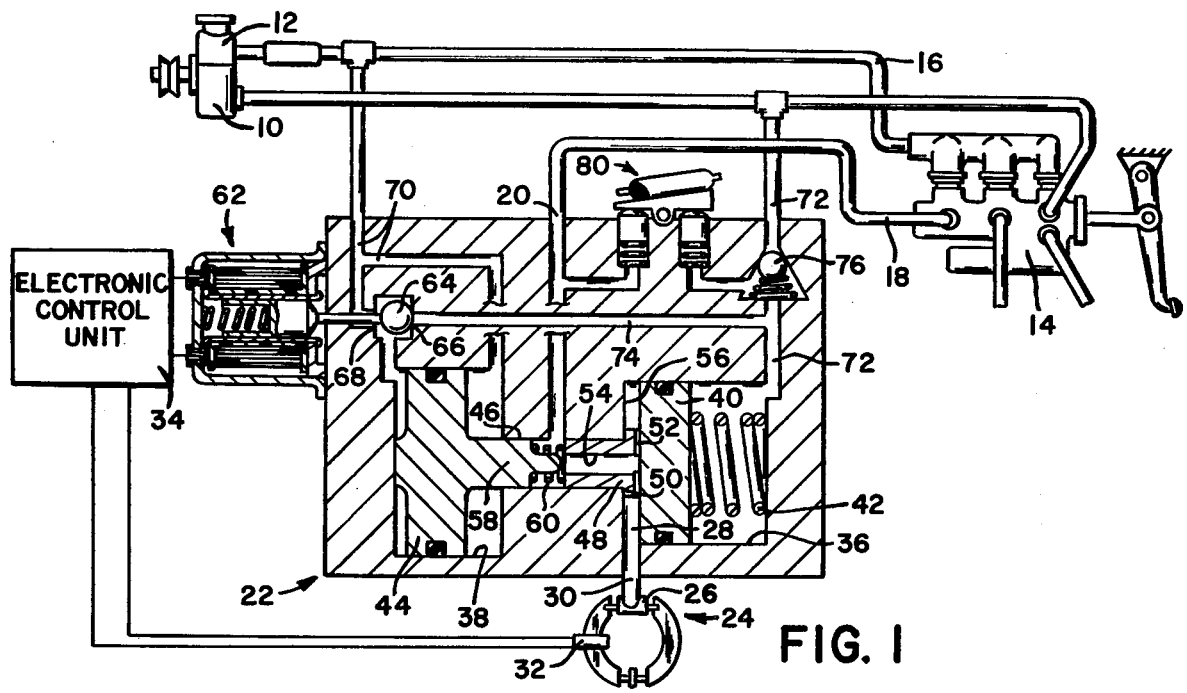
FIG. 1 is a schematic illustration of a brake system showing the modulator valve of the present invention in cross section.

In the brake system of FIG. 1 a pressure source 10 such as a power steering pump includes a reservoir 12 and is operable to communicate pressurized fluid to a fluid pressure generator 14 such as a master cylinder or brake booster. A return conduit 16 communicates the fluid pressure generator 14 with the reservoir 12 and an outlet conduit 18 cmmunicates with an inlet 20 on a modulator valve 22. A wheel assembly 24 includes a brake actuator 26 which communicates with a passage 28 in the modulator valve 22 via a conduit 30 and a wheel speed sensor 32 connects with an electronic control unit 34 to monitor the speed of rotation for the wheel assembly 24.

In accordance with the invention the modulator valve 22 forms a chamber 36 and a chamber 38. The chamber 36 slidably receives a first piston 40 which is biased to the left by a spring 42 and the chamber 38 slidably receives a second piston 44 which is larger in diameter than the first piston 40. The chambers 36 and 38 are connected by a bore 46 which slidably receives a sleeve 48 and intersects the inlet 20. The sleeve forms an enlarged end 50 with slots 52 to permit communication from the inlet 20 through a sleeve bore 54 to the chamber 36 on one side of the piston 40. Moreover, the enlarged end 50 abuts a chamber wall 56 and is engageable with the first piston 40 to limit the movement of the first piston to the left. The second piston 44 includes a projection 58 extending into the bore 46 and resiliently engaging the sleeve 48 by means of a spring 60. The end of the projection 58 is dimensioned to engage the sleeve 48 for the purpose of closing the bore 54 when the second piston 44 and projection 58 move against the spring 60.

The electronic control unit 34 is operatively connected with a solenoid valve 62 which terminates in a ball valve 64. In the normal condition illustrated, the ball valve 64 is urged against the valve seat 66 away from valve seat 68 so that both sides of the second piston 44 are exposed to the reservoir 12 via passages 70. Another passage 72 communicates one side of the first piston 40 with the pressure source 10 and a connecting passage 74 leads to the valve seat 66. A check valve 76 prevents fluid flow back to the pressure source 10.

Figure 2:
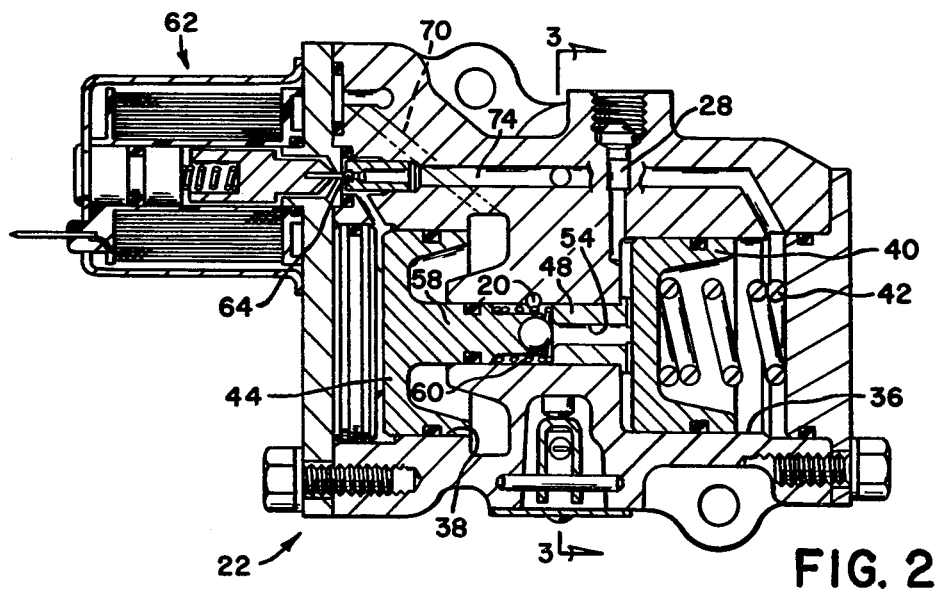
FIG. 2 is a cross section of a preferred embodiment of a modulator valve constructed in accordance with the present invention.
Figure 3:
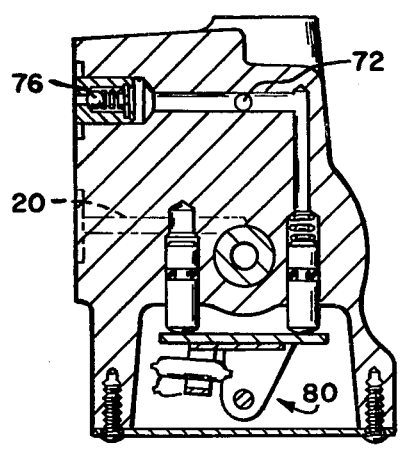
FIG. 3 is a cross section of FIG. 2 taken along line 3—3 of FIG. 2.

A safety switch 80 comprising a mercury connector cooperates with the modulator valve 22 and the solenoid valve 62 to disconnect the electronic control unit 34 from the latter when the fluid pressure of the pressure source 10, as measured in passage 72, is less than the fluid pressure generated by the fluid generator 14, as measured in the inlet 20. Turning to FIG. 2, the preferred modulator valve is shown with the reference numerals corresponding to the schematic modulator valve of FIG. 1. As the preferred and the schematic modulator valves operate in the same manner, the following Mode of Operation is equally applicable to the modulator valve of FIG. 1 or FIG. 2.

MODE OF OPERATION

During a normal braking application, pressurized fluid from the fluid pressure generator 14 is communicated to the modulator valve 22 via conduit 18. Within the modulator valve 22 the pressurized fluid communicates through the inlet 20, the bore 46, the sleeve bore 54, the slot 52 and the passage 28 in order to communicate with the brake mechanism 26 of the wheel assembly 24. In addition, the first piston 40 and the second piston 44 are maintained in the leftward position illustrated, as pressurized fluid from the pressure source 10 is communicated via passage 72 to the chamber 36 to oppose the one side of the first piston 40, and the solenoid valve 62 is deactivated to maintain the ball valve 64 against set 66, thereby communicating the chamber 38 on both sides of the second piston 44 with the reservoir 12. With the source 10 and the generator 14 developing pressurized fluid the switch 80 is connected so that the solenoid valve 62 will be responsive to the electronic control unit 34 if the latter is activated.

When a skidding condition for the wheel assembly 24 is imminent during braking, the wheel speed sensor 32 transmits a signal to the electronic control unit 34 which, in turn, actuates the solenoid valve 62 to move the ball valve 64 against the valve seat 68. Therefore, pressurized fluid from the pressure source 10 is communicated via passages 72 and 74 to the left face of the second piston 44. With the right face of the second piston exposed to the reservoir 12 via passage 70, the pressurized fluid on the left face urges the piston to move against spring 60 so that the projection 58 approaches the sleeve 48 to close the bore 54 thereby stopping communication of pressurized fluid to the imminent skidding wheel assembly 24. Continued rightward movement of the second piston 44 moves the sleeve 48 and the first piston 40 to the right. Because the second piston 44 is larger in diameter than the first piston 40, the force generated against the second piston 44 is larger than the force generated against the first piston 40 by the pressurized fluid in chamber 36 and the spring 42. When the first piston 40 moves to the right, the chamber 36 is enlarged to withdraw pressurized fluid from the brake mechanism 26, thereby reducing the pressure within the latter and avoiding skidding of the wheel assembly. The electronic control unit 34 senses the non-skidding condition of the wheel assembly by means of the wheel speed sensor 32 and deactivates the solenoid valve 62 to return the ball valve 64 against the valve seat 66. Consequently, both sides of the second piston 44 are exposed to the reservoir so that the spring 42 and pressurized fluid within chamber 36 urges the first piston 40, sleeve 48 and second piston 44 to move to the left. Therefore, the passage 28 is contracted to communicate pressurized fluid therein to the brake mechanism 26 to reapply the brakes. Continued movement of the second piston 44 by the force of spring 60 opens the passage 28 to the inlet 20 so that communication between the brake mechanism 26 and the fluid pressure generator 14 is reestablished to continue braking.

If the pressure source 10 is rendered inoperable during braking, the pressure of pressurized fluid within passage 72 will be substantially reduced in comparison to that at the inlet 20 so that the switch 80 will be disconnected to prevent actuation of the solenoid valve 62.

It is possible to utilize a pressure responsive valve member within the modulator valve 22 for the same purpose as the safety switch 80. Such a pressure responsive valve member would prevent communication between the chamber 38 and the pressure source 10 if the latter is inoperable. In addition, it is possible to include the sleeve 48 as an integral part of the first piston 40.

Although the foregoing description proceeds with reference to the accompanying drawings, there are many modifications and/or variations to the modulator valve which are possible by one skilled in the art, and it is intended that these modifications and/or variations are included within the scope of the appended claims.

I claim:

1. In a modulator valve cooperating with a control unit to relieve brake pressure for a wheel assembly when skidding of the latter is imminent, the modulator valve communicating with a pressure source and providing for communication between the wheel assembly and a fluid pressure generator via a passage in the modulator valve, the modulator valve being characterized by a pair of pistons being movably mounted within the modulator valve, one of said pair of pistons forming a portion of the passage and communicating with the pressure source opposite the portion of the passage, the other of said pair of pistons having opposite faces normally exposed to a reservoir, the control unit being activated to close communication between the reservoir and one face of the other piston and open communication between the pressure source and the other face of the other piston, and a sleeve movably disposed within the modulator valve passage, said sleeve abutting said one piston to substantially define a rest position for said one piston, said sleeve also defining a bore for communicating said fluid pressure generator with said wheel assembly and said other piston being normally spaced from said sleeve and movable into engagement with said sleeve when the control unit is activated to close said bore and to move said sleeve and said one piston away from said rest position.

* * * * *